(12) United States Patent
Zhu et al.

(10) Patent No.: US 11,933,893 B2
(45) Date of Patent: Mar. 19, 2024

(54) ULTRASONIC RADAR ARRAY, AND OBSTACLE DETECTION METHOD AND SYSTEM

(71) Applicant: Beijing Baidu Netcom Science and Technology Co., Ltd., Beijing (CN)

(72) Inventors: Xiaoxing Zhu, Beijing (CN); Xiang Liu, Beijing (CN); Fan Yang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 295 days.

(21) Appl. No.: 17/278,646

(22) PCT Filed: Dec. 23, 2019

(86) PCT No.: PCT/CN2019/127358
§ 371 (c)(1),
(2) Date: Mar. 22, 2021

(87) PCT Pub. No.: WO2020/147518
PCT Pub. Date: Jul. 23, 2020

(65) Prior Publication Data
US 2022/0043145 A1    Feb. 10, 2022

(30) Foreign Application Priority Data
Jan. 15, 2019   (CN) .......................... 201910036318.8

(51) Int. Cl.
*G01S 15/931* (2020.01)
*G01S 7/521* (2006.01)
*G01S 7/53* (2006.01)

(52) U.S. Cl.
CPC ............ *G01S 15/931* (2013.01); *G01S 7/521* (2013.01); *G01S 7/53* (2013.01); *G01S 2015/938* (2013.01)

(58) Field of Classification Search
CPC . G01S 7/521; G01S 15/87; G01S 7/53; G01S 7/52004; G01S 15/931; G01S 2015/938
See application file for complete search history.

(56) References Cited

U.S. PATENT DOCUMENTS

| | | | | |
|---|---|---|---|---|
| 4,803,670 A | * | 2/1989 | Chen | G01S 7/521 340/904 |
| 5,389,912 A | * | 2/1995 | Arvin | G01S 15/931 340/436 |

(Continued)

FOREIGN PATENT DOCUMENTS

| | | |
|---|---|---|
| CN | 1808177 A | 7/2006 |
| CN | 101169479 A | 4/2008 |

(Continued)

OTHER PUBLICATIONS

MicroTranic; 2016 Mercedes Benz 169-245 Active Park Assist (Year: 2016).*

(Continued)

*Primary Examiner* — Daniel L Murphy
*Assistant Examiner* — Amie M Ndure
(74) *Attorney, Agent, or Firm* — Kwan & Olynick LLP

(57) ABSTRACT

The present disclosure provides an ultrasonic radar array, an obstacle detection method and system. The method includes: obtaining obstacle information collected by ultrasonic radars in an ultrasonic radar array in an obstacle scenario; judging false detection and missed detection for the obstacle information collected by ultrasonic radars according a preset rule; processing the obstacle information collected by the ultrasonic radars according to the judgement result; determining a position of the obstacle according to the processed obstacle information collected by the ultrasonic radars.

18 Claims, 2 Drawing Sheets

(56) References Cited

U.S. PATENT DOCUMENTS

2010/0182874 A1 7/2010 Frank et al.
2011/0254674 A1* 10/2011 Wang .................... G01S 15/931
                                                    340/435
2014/0097971 A1 4/2014 Barth

FOREIGN PATENT DOCUMENTS

| | | | | |
|---|---|---|---|---|
| CN | 101900814 A | 12/2010 | | |
| CN | 101903797 A | 12/2010 | | |
| CN | 102385056 A | 3/2012 | | |
| CN | 102844674 A | 12/2012 | | |
| CN | 103649772 A | 3/2014 | | |
| CN | 104931972 A | 9/2015 | | |
| CN | 105116389 A | 12/2015 | | |
| CN | 106314327 A | 1/2017 | | |
| CN | 106681319 A | 5/2017 | | |
| CN | 106772396 A | 5/2017 | | |
| CN | 206900319 A | 1/2018 | | |
| CN | 107957583 A | 4/2018 | | |
| CN | 107966700 A | 4/2018 | | |
| CN | 207216423 A | 4/2018 | | |
| CN | 108037515 A | * | 5/2018 | ............. G01S 15/86 |
| CN | 108037515 A | 5/2018 | | |
| CN | 108333589 A | 7/2018 | | |
| CN | 108627844 A | 10/2018 | | |
| CN | 108828527 A | 11/2018 | | |
| CN | 108872991 A | 11/2018 | | |
| CN | 109050398 A | 12/2018 | | |
| CN | 109087481 A | 12/2018 | | |
| CN | 109765563 A | 5/2019 | | |
| CN | 109814114 A | 5/2019 | | |
| CN | 109634282 B | * | 5/2021 | ........... G01S 13/931 |
| DE | 102006019833 A | 12/2006 | | |
| DE | 102013200793 A1 | 8/2007 | | |
| DE | 102007029959 A1 | 1/2009 | | |
| DE | 102006007173 A1 | 7/2014 | | |
| DE | 102016118959 A | 4/2018 | | |
| DE | 102017108348 A | 6/2018 | | |
| EP | 2569650 B1 | 7/2016 | | |
| JP | H06324258 A | 11/1994 | | |
| JP | 2007274037 A | 10/2007 | | |
| JP | 2014052274 A | 3/2014 | | |
| JP | 2018048839 A | 3/2018 | | |
| WO | 2017125366 A1 | 7/2017 | | |

OTHER PUBLICATIONS

PCT International Search Report, PCT Patent Application No. PCT/CN2019/127358, dated Mar. 25, 2020, 15 pages.
Office Action, China Patent Application No. 201910036318.8, dated Apr. 28, 2020, 5 pages.
Search Report, China Patent Application No. 201910036318.8, dated Apr. 18, 2020, 5 pages.
First Japanese Office Action for JP2020-570048, dated Oct. 28, 2022, 7 pgs.
Notice of Allowance for CN 201910036318.8 dated Mar. 29, 2021, 4 pgs.
Extended European Search Report Issued in European Patent Application No. 19910464.7, dated Aug. 18, 2021, 12 Pages.

* cited by examiner

ULTRASONIC RADAR ARRAY, AND OBSTACLE DETECTION METHOD AND SYSTEM

This application is a national-phase application claiming the priority of PCT application No. PCT/CN2019/127358, filed Dec. 23, 2019, which claims the priority to Chinese Patent Application No. 201910036318.8, filed on Jan. 15, 2019, and entitled "Ultrasonic Radar Array, and Obstacle Detection Method and System" The disclosure of the above applications is incorporated herein by reference in its entirety.

FIELD OF THE DISCLOSURE

The present disclosure relates to the field of automatic control, and particularly to an ultrasonic radar array, and obstacle detection method and system.

BACKGROUND OF THE DISCLOSURE

Unmanned vehicles are a kind of intelligent vehicles, also referred to as wheeled mobile robots, and implement unmanned driving mainly depending on an intelligent driving instrument in the vehicle with a computer system as a core. The unmanned vehicle integrates many techniques such as automatic control, architecture, artificial intelligence and vision computing, are products of advanced development of computer sciences, mode recognition and intelligent control techniques, are also an important index for measuring a country's science and technological power and industrial level, and have a broad application prospect in the fields such as national defense and national economy.

Ultrasonic waves have characteristics such as better directivity, better applicability and strong penetration capability, and therefore are usually uploaded on the unmanned vehicle to function to avoid the obstacle.

SUMMARY OF THE DISCLOSURE

An aspect of the present disclosure provides an ultrasonic radar array, comprising N ultrasonic radars evenly mounted on a bumper of an unmanned vehicle, the N ultrasonic radars being distributed from a center to outer sides, with rotation angles gradually increasing towards the outer sides; wherein N is a positive integer, if N is an even number, a first ultrasonic radar is horizontally mounted on a left side of a center of the bumper, and a second ultrasonic radar is horizontally mounted on a right side of the center of the bumper; (N−2)/2 ultrasonic radars are mounted on the left side of the first ultrasonic radar from the center to the outer sides with a previous ultrasonic radar as a reference and is rotated away from the previous ultrasonic radar as reference by an angle of $\alpha$ in turn; (N−2)/2 ultrasonic radars are mounted on the right side of the second ultrasonic radar from the center to the outer sides with a previous ultrasonic radar as the reference by an angle of $\alpha$ in turn; if N is an odd number, a first ultrasonic radar is horizontally mounted at a center of the bumper, (N−1)/2 ultrasonic radars are mounted on the left side of the first ultrasonic radar from the center to the outer sides with a previous ultrasonic radar as a reference and is rotated away from the previous ultrasonic radar as reference by an angle of $\alpha$ in turn; (N−1)/2 ultrasonic radars are mounted on the right side of the first ultrasonic radar from the center to the outer sides with a previous ultrasonic radar as a reference and is rotated away from the previous ultrasonic radar as reference by an angle of $\alpha$ in turn, and wherein the number N and the rotation angles gradually increasing towards the outer sides are determined according to a mathematic model of a detection distance and detection shape of each ultrasonic radar, to ensure triple redundancy existing in the coverage ranges of the ultrasonic radars, wherein triple redundancy means that the coverage range of three ultrasonic radars are overlapped.

The present invention provides a method for detecting an obstacle with an ultrasonic radar array, the ultrasonic radar array comprising: N ultrasonic radars evenly mounted on a bumper of an unmanned vehicle, where N is a positive integer; the N ultrasonic radars are distributed from a center to outer sides, with rotation angles gradually increasing towards the outer sides, if N is an even number, a first ultrasonic radar is horizontally mounted on a left side of a center of the bumper, and a second ultrasonic radar is horizontally mounted on a right side of the center of the bumper; (N−2)/2 ultrasonic radars are mounted on the left side of the first ultrasonic radar from the center to the outer sides with a previous ultrasonic radar as a reference and is rotated away from the previous ultrasonic radar as reference by an angle of $\alpha$ in turn; (N−2)/2 ultrasonic radars are mounted on the right side of the second ultrasonic radar from the center to the outer sides with a previous ultrasonic radar as a reference and is rotated away from the previous ultrasonic radar as the reference by an angle of $\alpha$ in turn; if N is an odd number, a first ultrasonic radar is horizontally mounted at a center of the bumper, (N−1)/2 ultrasonic radars are mounted on the left side of the first ultrasonic radar from the center to the outer sides with a previous ultrasonic radar as a reference and is rotated away from the previous ultrasonic radar as reference by an angle of $\alpha$ in turn; (N−1)/2 ultrasonic radars are mounted on the right side of the first ultrasonic radar from the center to the outer sides with a previous ultrasonic radar as a reference and is rotated away from the previous ultrasonic radar as reference by an angle of $\alpha$ in turn, and wherein the number N and the rotation angles gradually increasing towards the outer sides are determined according to a mathematic model of a detection distance and detection shape of each ultrasonic radar, to ensure triple redundancy existing in the coverage ranges of the ultrasonic radars, wherein triple redundancy means that the coverage range of three ultrasonic radars are overlapped, the method comprising:

obtaining obstacle information collected by ultrasonic radars in an ultrasonic radar array in an obstacle scenario;

judging false detection and missed detection for the obstacle information collected by ultrasonic radars according a preset rule;

processing the obstacle information collected by the ultrasonic radars according to the judgment result;

determining a position of the obstacle according to the processed obstacle information collected by the ultrasonic radars.

The above aspect and any possible implementation further provide an implementation: the preset rule is judging whether there is false detection or missed detection in a to-be-judged ultrasonic radar according to whether adjacent ultrasonic radars of the to-be-judged ultrasonic radar return obstacle coordinates.

The above aspect and any possible implementation further provide an implementation: an adjacent ultrasonic radar of the to-be-judged ultrasonic radar is an ultrasonic radar which is immediately close to the to-be-judged ultrasonic radar on either side of the to-be-judged ultrasonic radar or an ultrasonic radar which is separated from the to-be-judged ultrasonic radar by one ultrasonic radar.

The above aspect and any possible implementation further provide an implementation: the preset rule for judging false detection comprises:

in a case that no adjacent ultrasonic radars of the to-be-judged ultrasonic radar returns obstacle coordinates, if the coverage range of the to-be-judged ultrasonic radar has coverage range of a single ultrasonic radar or an overlapped coverage range of two ultrasonic radars, it is judged there is no false detection; if the coverage range of the to-be-judged ultrasonic radar only has an overlapped coverage range of three ultrasonic radars, it is judged there is false detection;

in a case that one adjacent ultrasonic radar of the to-be-judged ultrasonic radar returns obstacle coordinates, it is judged there is no false detection;

in a case that two adjacent ultrasonic radars of the to-be-judged ultrasonic radar return obstacle coordinates, it is judged there is false detection.

The above aspect and any possible implementation further provide an implementation: the preset rule for judging missed detection comprises:

in a case that no adjacent ultrasonic radars of the to-be-judged ultrasonic radar returns obstacle coordinates, it is judged there is no missed detection in the to-be-judged ultrasonic radar;

in a case that one adjacent ultrasonic radar of the to-be-judged ultrasonic radar returns obstacle coordinates, if the coverage ranges of the to-be-judged ultrasonic radar and the adjacent ultrasonic radar returning obstacle coordinates have an overlapped coverage range of two ultrasonic radars, it is judged there is missed detection; if the coverage ranges of the to-be-judged ultrasonic radar and the adjacent ultrasonic radar returning the obstacle coordinates only have an overlapped coverage range of three ultrasonic radars, it is judged there is no missed detection;

in a case that two adjacent ultrasonic radars of the to-be-judged ultrasonic radar return obstacle coordinates, if the coverage ranges of the to-be-judged ultrasonic radar and the adjacent ultrasonic radars returning obstacle coordinates have an overlapped coverage range of three ultrasonic radars, it is judged there is missed detection; if the coverage ranges of the to-be-judged ultrasonic radar and the adjacent ultrasonic radars returning obstacle coordinates do not have an overlapped coverage range of three ultrasonic radars, it is judged there is no missed detection;

in a case that three or more adjacent ultrasonic radars of the to-be-judged ultrasonic radar return obstacle coordinates, it is judged there is missed detection.

The above aspect and any possible implementation further provide an implementation: the processing the obstacle information collected by the ultrasonic radars according to the judgment result comprises:

if false detection exists in the obstacle information collected by the ultrasonic radar, deleting the obstacle information collected by the ultrasonic radar that falsely detects;

if missed detection exists in the ultrasonic radar, obtaining the obstacle information collected by the ultrasonic radar that misses detection according to the obstacle information returned by its adjacent ultrasonic radars.

The above aspect and any possible implementation further provide an implementation: the determining a position of the obstacle according to the processed obstacle information collected by the ultrasonic radars comprises:

fusing distance data returned by a plurality ultrasonic radars to obtain final obstacle coordinates.

The present invention provides a system for detecting an obstacle with an ultrasonic radar array, comprising:

an obtaining module configured to obtain obstacle information collected by ultrasonic radars in an ultrasonic radar array in an obstacle scenario;

a judging module configured to judge false detection and missed detection for the obstacle information collected by ultrasonic radars according a preset rule;

a processing module configured to process the obstacle information collected by the ultrasonic radars according to the judgment result;

a determining module configured to determine a position of the obstacle according to the processed obstacle information collected by the ultrasonic radars.

The above aspect and any possible implementation further provide an implementation: the preset rule is judging whether there is false detection or missed detection in a to-be-judged ultrasonic radar according to whether adjacent ultrasonic radars of the to-be-judged ultrasonic radar return obstacle coordinates.

The above aspect and any possible implementation further provide an implementation: an adjacent ultrasonic radar of the to-be-judged ultrasonic radar is an ultrasonic radar which is immediately close to the to-be-judged ultrasonic radar on either side of the to-be-judged ultrasonic radar or an ultrasonic radar which is separated from the to-be-judged ultrasonic radar by one ultrasonic radar.

The above aspect and any possible implementation further provide an implementation: the preset rule for judging false detection comprises:

in a case that no adjacent ultrasonic radars of the to-be-judged ultrasonic radar returns obstacle coordinates, if the coverage range of the to-be-judged ultrasonic radar has a coverage range of single ultrasonic radar or an overlapped coverage range of two ultrasonic radars, it is judged there is no false detection; if the coverage range of the to-be-judged ultrasonic radar only has an overlapped coverage range of three ultrasonic radars, it is judged there is false detection;

in a case that one adjacent ultrasonic radar of the to-be-judged ultrasonic radar returns obstacle coordinates, it is judged there is no false detection;

in a case that two adjacent ultrasonic radars of the to-be-judged ultrasonic radar return obstacle coordinates, it is judged there is false detection.

The above aspect and any possible implementation further provide an implementation: the preset rule for judging missed detection comprises:

in a case that no adjacent ultrasonic radars of the to-be-judged ultrasonic radar return obstacle coordinates, it is judged there is no missed detection in the to-be-judged ultrasonic radar;

in a case that one adjacent ultrasonic radar of the to-be-judged ultrasonic radar returns obstacle coordinates, if the coverage ranges of the to-be-judged ultrasonic radar and the adjacent ultrasonic radar returning obstacle coordinates have an overlapped coverage range of two ultrasonic radars, it is judged there is missed detection; if the coverage ranges of the to-be-judged ultrasonic radar and the adjacent ultrasonic radar returning the obstacle coordinates only have an overlapped coverage range of three ultrasonic radars, it is judged there is no missed detection;

in a case that two adjacent ultrasonic radars of the to-be-judged ultrasonic radar return obstacle coordinates, if the coverage ranges of the to-be-judged ultrasonic radar and the adjacent ultrasonic radars returning obstacle coordinates have an overlapped coverage range of three ultrasonic radars, it is judged there is missed detection; if the coverage ranges of the to-be-judged ultrasonic radar and the adjacent ultrasonic radars returning obstacle coordinates do not have an overlapped coverage range of three ultrasonic radars, it is judged there is no missed detection;

in a case that three or more adjacent ultrasonic radars of the to-be-judged ultrasonic radar return obstacle coordinates, it is judged there is missed detection.

The above aspect and any possible implementation further provide an implementation: the processing module is specifically configured to:

if false detection exists in the obstacle information collected by the ultrasonic radar, delete the obstacle information collected by the ultrasonic radar that falsely detects;

if missed detection exists in the ultrasonic radar, obtain the obstacle information collected by the ultrasonic radar that misses detection according to the obstacle information returned by its adjacent ultrasonic radars.

The above aspect and any possible implementation further provides, an implementation: the determining module is specifically configured to:

fuse distance data returned by a plurality ultrasonic radars to obtain final obstacle coordinates.

A further aspect of the present invention provides a computer device, comprising a memory, a processor and a computer program which is stored on the memory and runs on the processor, the processor, upon executing the program, implementing the above-mentioned method.

A further aspect of the present invention provides a computer-readable storage medium on which a computer program is stored, the program, when executed by the processor, implementing the aforesaid method.

As known from the above technical solutions, embodiment of the present application may effectively judge false detection and missed detection happening to the ultrasonic radars in the ultrasonic radar array, precisely determine the position of the obstacle and improve the driving safety of the unmanned vehicle.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

The present disclosure will be described in detail with reference to figures and specific embodiments to make objects, technical solutions and advantages of the present invention more apparent.

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

A plurality of aspects of the present disclosure provide an ultrasonic radar array, an obstacle detection method and system, to improve the accuracy and reliability of ultrasonic obstacle detection, cover the transverse blind region of the unmanned vehicles and improve the driving safety.

Figure 1:
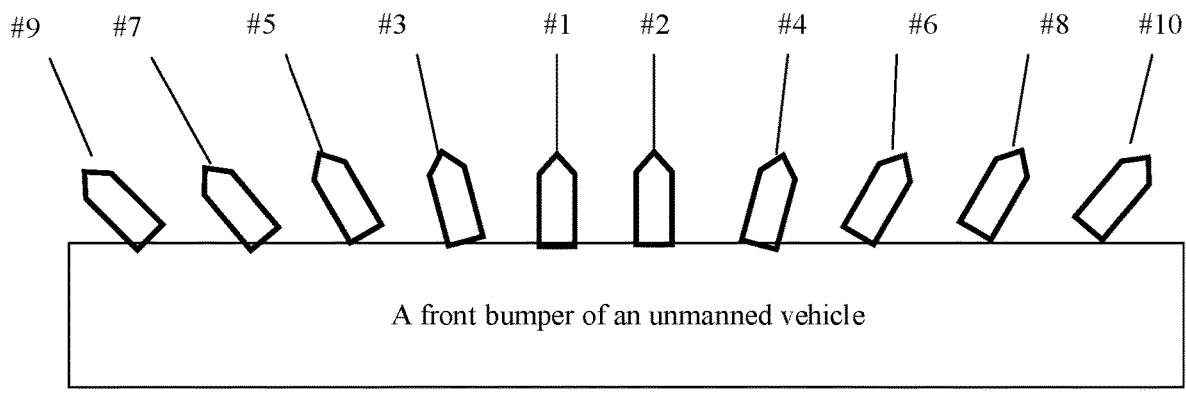
FIG. 1 is a structural schematic diagram of an ultrasonic radar array according to a first embodiment of the present disclosure.

FIG. 1 is a structural schematic diagram of an ultrasonic radar array according to a first embodiment of the present disclosure. As shown in FIG. 1, the ultrasonic radar array comprises 10 ultrasonic radars which each comprise an ultrasonic wave transmitting circuit and an ultrasonic wave receiving circuit.

Ultrasonic radars #9, #7, #5, #3, #1, #2, #4, #6, #8, and #10 are evenly mounted on a front bumper of the unmanned vehicle. Starting from the ultrasonic radar #9 which is on the left-most side and rotated counterclockwise by an angle $4\alpha$ with a state upon horizontal mounting as a reference, each ultrasonic radar is rotated clockwise by an angle $\alpha$ until the ultrasonic radar #10 on the right-most side is rotated clockwise by an angle $4\alpha$ with the state upon horizontal mounting as a reference.

Specifically, the ten ultrasonic radars are evenly mounted on the front bumper of the unmanned vehicle, ultrasonic radar #1 is horizontally mounted on the left side of a center of the front bumper; ultrasonic radar #2 is horizontally mounted on the right side of the center of the front bumper; ultrasonic radar #3 is mounted on the left side of ultrasonic radar #1 and rotated counterclockwise by an angle $\alpha$ with the state upon horizontal mounting as the reference; ultrasonic radar #4 is mounted on the right side of ultrasonic radar #2 and rotated clockwise by an angle $\alpha$ with the state upon horizontal mounting as the reference; ultrasonic radar #5 is mounted on the left side of ultrasonic radar #3 and rotated counterclockwise by an angle $2\alpha$ with the state upon horizontal mounting as the reference; ultrasonic radar #6 is mounted on the right side of ultrasonic radar #4 and rotated clockwise by an angle $2\alpha$ with the state upon horizontal mounting as the reference; ultrasonic radar #7 is mounted on the left side of ultrasonic radar #5 and rotated counterclockwise by an angle $3\alpha$ with the state upon horizontal mounting as the reference; ultrasonic radar #8 is mounted on the right side of ultrasonic radar #6 and rotated clockwise by an angle $3\alpha$ with the state upon horizontal mounting as the reference; ultrasonic radar #9 is mounted on the left side of ultrasonic radar #5 and rotated counterclockwise by an angle $4\alpha$ with the state upon horizontal mounting as the reference; ultrasonic radar #10 is mounted on the right side of ultrasonic radar #8 and rotated clockwise by an angle 4α with the state upon horizontal mounting as the reference.

α is preferably 5°. A horizontal beam angle of the ultrasonic radars is 45°, and a coverage range of the ultrasonic radars is 0-3.5 m.

The ten ultrasonic radars have a certain fault-tolerance capability because their coverage ranges are superimposed. The superimposed coverage ranges of the ultrasonic radars need to be determined to facilitate error detection and correction in the subsequent obstacle detection procedure.

Preferably, the coverage range of each ultrasonic radar in its own coordinate system is determined according to a mathematic model of a detection distance and detection shape of each ultrasonic radar.

The coordinate system of each ultrasonic radar is unified into a reference coordinate system. In the present embodiment, the reference coordinate system is a vehicle coordinate system. Matrix transformation is performed through a relationship between initial space configuration of each ultrasonic radar on the unmanned vehicle and the vehicle coordinate system. The initial space configuration of the ultrasonic radar is already known in advance and may be obtained according to measurement data of the plurality of ultrasonic radars on the vehicle body of the unmanned vehicle.

The coverage ranges of the ultrasonic radars after being unified into the reference coordinate system are superimposed in a preset detection region. Preferably, the gridded preset detection region is in a range of 15-350 cm in front of and lateral front side of the vehicle body.

It is possible to, through the above steps, obtain the situations about the coverage ranges of the ultrasonic radar array and the overlap of coverage ranges of the ultrasonic radars, for example, to determine a single ultrasonic radar coverage range, the overlap of two ultrasonic radar coverage ranges, the overlap of three ultrasonic radar coverage ranges, and so on.

It is very necessary to determine the overlap of the ultrasonic radar coverage ranges. For example, if the obstacle appears in the coverage range of the ultrasonic radar #9, there might be several cases: the obstacle is located in a single ultrasonic radar coverage range in the coverage range of ultrasonic radar #9, in the overlap of two ultrasonic radar coverage ranges, and in the overlap of the three ultrasonic radar coverage. In the present embodiment, ultrasonic radars function to detect obstacles and have a high tolerance for missed detection. Therefore, even though only ultrasonic radar #9 returns obstacle information, it is also believed that the obstacle is located in a single ultrasonic radar coverage range in the coverage range of ultrasonic radar #9, rather than that detection omission appears in its adjacent ultrasonic radar #7 or ultrasonic radar #5.

It is feasible that coverage ranges of three ultrasonic radars overlap within a range of 2 m in front of the unmanned vehicle, so that a decision-making system votes according to the obstacle information returned by the three ultrasonic radars.

The fault-tolerance capability in obstacle detection is achieved through the ultrasonic radar array according to the present embodiment and through the superimposition of coverage ranges of the plurality of ultrasonic radars.

Figure 2:
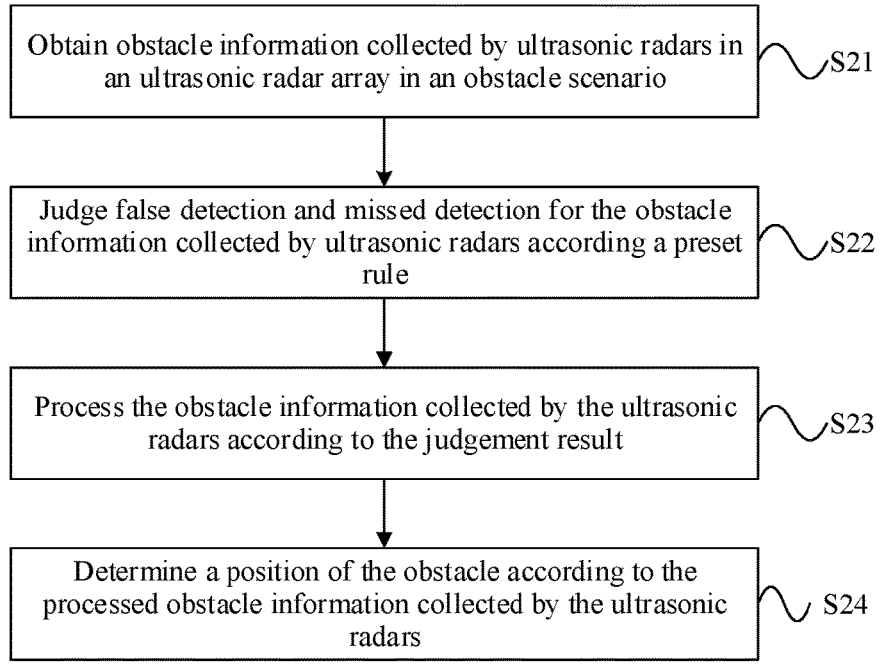
FIG. 2 is a flow chart of a method for detecting an obstacle with an ultrasonic radar array according to a second embodiment of the present disclosure.

FIG. 2 is a flow chart of a method for detecting an obstacle with an ultrasonic radar array according to a second embodiment of the present disclosure. As shown in FIG. 2, the method comprises:

Step S21: obtaining obstacle information collected by ultrasonic radars in the ultrasonic radar array described in the first embodiment in an obstacle scenario, and converting coordinates into a vehicle body coordinate system;

The initial space configuration of the ultrasonic radar is already known in advance and may be obtained according to measurement data of the plurality of ultrasonic radars on the vehicle body of the unmanned vehicle. Coordinates of targets in respective radar coordinate systems are converted into the vehicle body coordinate system.

S22: judging false detection and missed detection for the obstacle information collected by ultrasonic radars in the ultrasonic radar array according a preset rule.

A basic principle of the preset rule is that when one ultrasonic radar falsely detects and if its adjacent ultrasonic radars do not falsely detect, the obstacle coordinates will not be returned; when one ultrasonic radar misses detection and if its adjacent ultrasonic radars do not miss detection, the obstacle coordinates are returned.

The rule for judging false detection is as follows:
if the obstacle coordinates returned by the ultrasonic radar are received, judge whether adjacent ultrasonic radars of the to-be-judged ultrasonic radar return the obstacle coordinates;
if adjacent ultrasonic radars of the to-be-judged ultrasonic radar do not return the obstacle coordinates, judge whether the to-be-judged ultrasonic radar has a single ultrasonic radar coverage range, for example, ultrasonic radar #9 or ultrasonic radar #10 located at the edge of the ultrasonic radar array;
if the coverage range of the to-be-judged ultrasonic radar has a single ultrasonic radar coverage range, believe that the obstacle appears in the single ultrasonic radar coverage range of the to-be-judged ultrasonic radar; false detection does not appear in the to-be-judged ultrasonic radar.

If the coverage range of the ultrasonic radar has two ultrasonic radar coverage ranges, for example, ultrasonic radar #7 and ultrasonic radar #8, its detection range at least overlaps one adjacent ultrasonic radar coverage range, for example, ultrasonic radar #7 returns the obstacle coordinates, the adjacent ultrasonic radar #9 does not return the obstacle coordinates, and the adjacent ultrasonic radar #5 neither returns the obstacle coordinates; in this case, there are many possibilities: if the obstacle is located in two ultrasonic radar coverage ranges in the coverage range of the ultrasonic radar #7, namely, coverage ranges overlapping ultrasonic radar #9, it is possible that ultrasonic radar #9 misses detection or ultrasonic radar #7 falsely detects. If the obstacle is located in three ultrasonic radar coverage ranges in the coverage range of the ultrasonic radar #7, namely, coverage ranges overlapping ultrasonic radar #9 and ultrasonic radar #5, it is possible that ultrasonic radar #7 falsely detects because none of ultrasonic radar #9 and ultrasonic radar #5 returns the obstacle coordinates. For the sake of safety, it is believed that the obstacle is located in two ultrasonic radar coverage ranges in the coverage range of the ultrasonic radar #7, namely, coverage ranges overlapping ultrasonic radar #9, and ultrasonic radar 9 misses detection. The reason is that if false detection happens, the false detection is only likely to cause the stop of the unmanned vehicle, and a detection result at next time is awaited; if missed detection happens, the missed detection is much likely to cause collision If only three ultrasonic radar coverage ranges overlap in the coverage range of the ultrasonic radar, for example, ultrasonic radar #5, ultrasonic radar #3, ultrasonic radar #1, ultrasonic radar #2, ultrasonic radar #4, and ultrasonic radar #6, and the detection range of the ultrasonic radar overlaps the coverage ranges of two adjacent ultrasonic radars, in the case that none of the two adjacent ultrasonic radars returns an obstacle detection result, it is believed that the false detection happens to the to-be-judged ultrasonic radar.

If the number of adjacent ultrasonic radars returning the obstacle coordinates is one, judge whether coverage ranges of two ultrasonic radars exist in the coverage range of the to-be-judged ultrasonic radar;

If NO, it is believed that missed detection happens to the ultrasonic radar, for example, coverage ranges of three ultrasonic radars overlap in the coverage range of ultrasonic radar #1; if only one adjacent ultrasonic radar #2 returns the obstacle coordinates, its adjacent ultrasonic radar #3 or #4 should return the obstacle coordinates; if the obstacle coordinates are not returned, missed detection happens to its adjacent ultrasonic radar #3 or #4;

If YES, further judge whether the coverage range of the adjacent ultrasonic radar returning the obstacle coordinates has two ultrasonic radar coverage ranges with the to-be-judged ultrasonic radar;

If YES, false detection does not exist; for example, if the to-be-judged ultrasonic radar #9 and the adjacent ultrasonic radar #7 have two ultrasonic radar coverage ranges overlapping, the obstacle is located in the overlapping region;

If NO, it is believed that missed detection happens to the ultrasonic radar array. For example, if the to-be-judged ultrasonic radar #7 returns the obstacle coordinates, the adjacent ultrasonic radar #5 returns the obstacle coordinates, and the ultrasonic radar #7 and ultrasonic radar #5 only have three ultrasonic radar coverage ranges overlapping, this proves that missed detection happens to ultrasonic radar #9 or ultrasonic radar #3.

If the number of adjacent ultrasonic radars returning the obstacle coordinates is two, it is not believed that false detection happens to the to-be-detected radar.

The rule for judging the missed detection is as follows:
if the obstacle coordinates returned by the ultrasonic radar is not received, judge whether an adjacent ultrasonic radar of the to-be-judged ultrasonic radar returns the obstacle coordinates;
if an adjacent ultrasonic radar of the to-be-judged ultrasonic radar does not return the obstacle coordinates, judge that missed detection does not happen to the to-be-judged ultrasonic radar;
if the adjacent ultrasonic radar of the to-be-judged ultrasonic radar returns the obstacle coordinates,
judge the number of adjacent ultrasonic radar returning the obstacle coordinates;
if the number of adjacent ultrasonic radar returning the obstacle coordinates is one, judge whether the coverage ranges of the to-be-judged ultrasonic radar and the adjacent ultrasonic radar returning the obstacle coordinate have two ultrasonic radar coverage ranges;
if there are two ultrasonic radar coverage ranges, it is believed that missed detection happens to the to-be-judged ultrasonic radar. For example, if the obstacle is located in two ultrasonic radar coverage ranges in the coverage range of ultrasonic radar #7, namely, in the coverage range overlapping the ultrasonic radar #9, ultrasonic radar #9 does not return the obstacle coordinates and the adjacent ultrasonic radar #7 returns the obstacle coordinates. For the sake of safety, it is believed that missed detection happens to ultrasonic radar #9. The reason is that if false detection happens, the false detection is only likely to cause the stop of the unmanned vehicle, and a detection result at next time is awaited; if missed detection happens, the missed detection is much likely to cause collision.

If there are not two ultrasonic radar coverage ranges and there are only three ultrasonic radar coverage ranges, since only one of the three ultrasonic radars returns the obstacle coordinates, it is believed that false detection happens to the ultrasonic radar returning the obstacle coordinates, and missed detection does not happen to the to-be-judged ultrasonic radar. For example, if ultrasonic radar #1 does not return the obstacle coordinates, its adjacent ultrasonic radars #3 and #2 both return the obstacle coordinates, ultrasonic radar #1 and ultrasonic radar #3 and ultrasonic radar #2 have three ultrasonic radar coverage ranges, missed detection happens to ultrasonic radar 1.

If the number of adjacent ultrasonic radars returning the obstacle coordinates is two, judgment is made as to whether the coverage ranges of the to-be-judged ultrasonic radar and two adjacent ultrasonic radars returning the obstacle coordinates have three ultrasonic radar coverage ranges; if there are three ultrasonic radar coverage ranges, it is believed that missed detection happens to the to-be-judged ultrasonic radar; if there are not three ultrasonic radar coverage ranges, it is not believed that missed detection happens to the to-be-judged ultrasonic radar.

If the number of adjacent ultrasonic radars returning the obstacle coordinates is three or more, it is believed that missed detection happens to the to-be-judged ultrasonic radar.

Through the above steps, false detection or missed detection of the to-be-judged ultrasonic radar is adjusted according to the mutual overlap of coverage ranges of the to-be-judged ultrasonic radar and its adjacent ultrasonic radars, and the obstacle coordinates returned by the ultrasonic radars in the ultrasonic radar array.

Step S23: processing the obstacle information collected by the ultrasonic radars in the ultrasonic radar array according to a judgment result.

Preferably, if the detection result shows false detection, the obstacle information collected by the ultrasonic radar that falsely detects is deleted.

Preferably, if the detection result shows missed detection, the obstacle information collected by the ultrasonic radar that misses detection may be obtained according to the obstacle information returned by its adjacent ultrasonic radars. In the case that one adjacent ultrasonic radar of the to-be-judged ultrasonic radar returns the obstacle coordinates, the obstacle coordinates returned by the adjacent ultrasonic radar is taken as the obstacle coordinates collected by the to-be-judged ultrasonic radar. In the case that two or more adjacent ultrasonic radars of the to-be-judged ultrasonic radar return the obstacle coordinates, the distance data returned by the two or more ultrasonic radars are fused by a triangulation-based fusion method.

For example, if ultrasonic radar #1 does not return the obstacle coordinates, and its adjacent ultrasonic radars #3 and #2 both return the obstacle coordinates, the obstacle coordinates corresponding to the ultrasonic radar #1 are determined according to the obstacle coordinates returned by its adjacent ultrasonic radars #3 and #2.

If the detection result does not show false detection or missed detection, the obstacle information collected by the ultrasonic radars in the ultrasonic radar array are not processed.

Step S24: determining a position of the obstacle in the vehicle body coordinate system according to the processed obstacle information collected by the ultrasonic radars, and performing unmanned vehicle decision-making according to the position of the obstacle.

Preferably, if a single ultrasonic radar returns the obstacle coordinates, it is determined that the obstacle is located on a portion where a circular arc with the single ultrasonic radar as the origin and with the obstacle distance as a radius is located in the single ultrasonic radar coverage range of the ultrasonic radar.

Preferably, if two or more adjacent ultrasonic radars return the obstacle coordinates, the distance data returned by the two ultrasonic radars are fused by the triangulation-based fusion method to obtain edge fixed point information of the obstacle.

Preferably, if three or more adjacent ultrasonic radars return the obstacle coordinates, since there is a large number of times of fusion by the triangulation-based fusion method, fusion processing may be performed by a circumcircle method. As for the same edge point of the obstacle, theoretically circular arcs of the plurality of ultrasonic radars with the ultrasonic radar as the origin and the obstacle distance as the radius should intersect at one point. However, in fact, the plurality of segments of circular arcs do not intersect at one point due to factors such as measurement errors and noise interference. Hence, three ultrasonic radars are taken as a group, each group have three segments of circular arcs intersecting at three points, a center of the circumcircle of the three points is taken as a final measurement result of the three ultrasonic radars, and finally, an average value of final measurement results of groups of ultrasonic radars is finally solved as a final fusion result.

It is possible to, through the embodiment of the present application, effectively judge false detection and missed detection happening to the ultrasonic radars in the ultrasonic radar array, precisely determine the position of the obstacle and improve the driving safety of the unmanned vehicle.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above introduces the method embodiments. The solution of the present disclosure will be further described through an apparatus embodiment.

Figure 3:
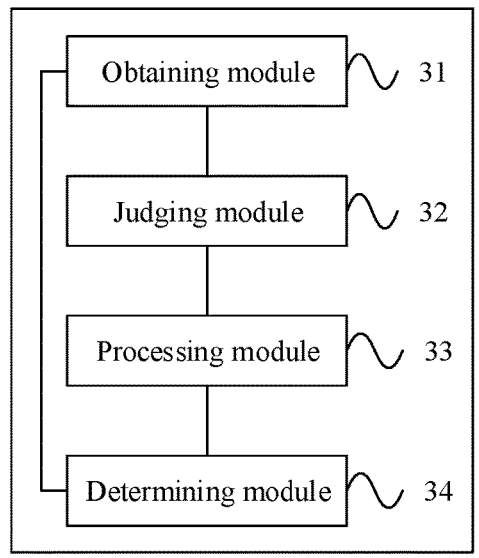
FIG. 3 is a structural schematic diagram of a system for detecting an obstacle with an ultrasonic radar array according to a third embodiment of the present disclosure.

FIG. 3 is a structural schematic diagram of a system for detecting an obstacle with an ultrasonic radar array according to a third embodiment of the present disclosure. As shown in FIG. 3, the system comprises:

an obtaining module 31 configured to obtain obstacle information collected by ultrasonic radars in the ultrasonic radar array described in the first embodiment in an obstacle scenario, and convert coordinates into a vehicle body coordinate system;

The initial space configuration of the ultrasonic radar is already known in advance and may be obtained according to measurement data of the plurality of ultrasonic radars on the vehicle body of the unmanned vehicle. Coordinates of targets in respective radar coordinate systems are converted into the vehicle body coordinate system.

A judging module 32 configured to judge false detection and missed detection for the obstacle information collected by ultrasonic radars in the ultrasonic radar array according a preset rule.

A basic principle of the preset rule is that when one ultrasonic radar falsely detects and if its adjacent ultrasonic radars do not falsely detect, the obstacle coordinates will not be returned; when one ultrasonic radar misses detection and if its adjacent ultrasonic radars do not miss detection, the obstacle coordinates are returned.

The rule for judging false detection is as follows:
if the obstacle coordinates returned by the ultrasonic radar are received, judge whether adjacent ultrasonic radars of the to-be-judged ultrasonic radar return the obstacle coordinates;
if adjacent ultrasonic radars of the to-be-judged ultrasonic radar do not return the obstacle coordinates, judge whether the to-be-judged ultrasonic radar has a single ultrasonic radar coverage range, for example, ultrasonic radar #9 or ultrasonic radar #10 located at the edge of the ultrasonic radar array;
if the coverage range of the to-be-judged ultrasonic radar has a single ultrasonic radar coverage range, believe that the obstacle appears in the single ultrasonic radar coverage range of the to-be-judged ultrasonic radar; false detection does not appear in the to-be-judged ultrasonic radar.

If the coverage range of the ultrasonic radar has two ultrasonic radar coverage ranges, for example, ultrasonic radar #7 and ultrasonic radar #8, its detection range at least overlaps one adjacent ultrasonic radar coverage range, for example, ultrasonic radar #7 returns the obstacle coordinates, the adjacent ultrasonic radar #9 does not return the obstacle coordinates, and the adjacent ultrasonic radar #5 neither returns the obstacle coordinates; in this case, there are many possibilities: if the obstacle is located in two ultrasonic radar coverage ranges in the coverage range of the ultrasonic radar #7, namely, coverage ranges overlapping ultrasonic radar #9, it is possible that ultrasonic radar #9 misses detection or ultrasonic radar #7 falsely detects. If the obstacle is located in three ultrasonic radar coverage ranges in the coverage range of the ultrasonic radar #7, namely, coverage ranges overlapping ultrasonic radar #9 and ultrasonic radar #5, it is possible that ultrasonic radar #7 falsely detects because none of ultrasonic radar #9 and ultrasonic radar #5 returns the obstacle coordinates. For the sake of safety, it is believed that the obstacle is located in two ultrasonic radar coverage ranges in the coverage range of the ultrasonic radar #7, namely, coverage ranges overlapping ultrasonic radar #9, and ultrasonic radar 9 misses detection. The reason is that if false detection happens, the false detection is only likely to cause the stop of the unmanned vehicle, and a detection result at next time is awaited; if missed detection happens, the missed detection is much likely to cause collision If only three ultrasonic radar coverage ranges overlap in the coverage range of the ultrasonic radar, for example, ultrasonic radar #5, ultrasonic radar #3, ultrasonic radar #1, ultrasonic radar #2, ultrasonic radar #4, and ultrasonic radar #6, and the detection range of the ultrasonic radar overlaps the coverage ranges of two adjacent ultrasonic radars, in the case that none of the two adjacent ultrasonic radars returns an obstacle detection result, it is believed that the false detection happens to the to-be-judged ultrasonic radar.

If the number of adjacent ultrasonic radars returning the obstacle coordinates is one, judge whether coverage ranges of two ultrasonic radars exist in the coverage range of the to-be-judged ultrasonic radar;

If NO, it is believed that missed detection happens to the ultrasonic radar, for example, coverage ranges of three ultrasonic radars overlap in the coverage range of ultrasonic radar #1; if only one adjacent ultrasonic radar #2 returns the obstacle coordinates, its adjacent ultrasonic radar #3 or #4 should return the obstacle coordinates; if the obstacle coordinates are not returned, missed detection happens to its adjacent ultrasonic radar #3 or #4;

If YES, further judge whether the coverage range of the adjacent ultrasonic radar returning the obstacle coordinates has two ultrasonic radar coverage ranges with the to-be-judged ultrasonic radar;

If YES, false detection does not exist; for example, if the to-be-judged ultrasonic radar #9 and the adjacent ultrasonic radar #7 have two ultrasonic radar coverage ranges overlapping, the obstacle is located in the overlapping region;

If NO, it is believed that missed detection happens to the ultrasonic radar array. For example, if the to-be-judged ultrasonic radar #7 returns the obstacle coordinates, the adjacent ultrasonic radar #5 returns the obstacle coordinates, and the ultrasonic radar #7 and ultrasonic radar #5 only have three ultrasonic radar coverage ranges overlapping, this proves that missed detection happens to ultrasonic radar #9 or ultrasonic radar #3.

If the number of adjacent ultrasonic radars returning the obstacle coordinates is two, it is not believed that false detection happens to the to-be-detected radar.

The rule for judging the missed detection is as follows:
if the obstacle coordinates returned by the ultrasonic radar is not received, judge whether an adjacent ultrasonic radar of the to-be-judged ultrasonic radar returns the obstacle coordinates;

if an adjacent ultrasonic radar of the to-be-judged ultrasonic radar does not return the obstacle coordinates, judge that missed detection does not happen to the to-be-judged ultrasonic radar;

if the adjacent ultrasonic radar of the to-be-judged ultrasonic radar returns the obstacle coordinates, judge the number of adjacent ultrasonic radar returning the obstacle coordinates;

if the number of adjacent ultrasonic radar returning the obstacle coordinates is one, judge whether the coverage ranges of the to-be-judged ultrasonic radar and the adjacent ultrasonic radar returning the obstacle coordinate have two ultrasonic radar coverage ranges;

if there are two ultrasonic radar coverage ranges, it is believed that missed detection happens to the to-be-judged ultrasonic radar. For example, if the obstacle is located in two ultrasonic radar coverage ranges in the coverage range of ultrasonic radar #7, namely, in the coverage range overlapping the ultrasonic radar #9, ultrasonic radar #9 does not return the obstacle coordinates and the adjacent ultrasonic radar #7 returns the obstacle coordinates. For the sake of safety, it is believed that missed detection happens to ultrasonic radar #9. The reason is that if false detection happens, the false detection is only likely to cause the stop of the unmanned vehicle, and a detection result at next time is awaited; if missed detection happens, the missed detection is much likely to cause collision.

If there are not two ultrasonic radar coverage ranges and there are only three ultrasonic radar coverage ranges, since only one of the three ultrasonic radars returns the obstacle coordinates, it is believed that false detection happens to the ultrasonic radar returning the obstacle coordinates, and missed detection does not happen to the to-be-judged ultrasonic radar. For example, if ultrasonic radar #1 does not return the obstacle coordinates, its adjacent ultrasonic radars #3 and #2 both return the obstacle coordinates, and ultrasonic radar #1 and ultrasonic radar #3 and ultrasonic radar #2 have three ultrasonic radar coverage ranges, missed detection happens to ultrasonic radar 1.

If the number of adjacent ultrasonic radars returning the obstacle coordinates is two, judgment is made as to whether the coverage ranges of the to-be-judged ultrasonic radar and two adjacent ultrasonic radars returning the obstacle coordinates have three ultrasonic radar coverage ranges; if there are three ultrasonic radar coverage ranges, it is believed that missed detection happens to the to-be-judged ultrasonic radar; if there are not three ultrasonic radar coverage ranges, it is not believed that missed detection happens to the to-be-judged ultrasonic radar.

If the number of adjacent ultrasonic radars returning the obstacle coordinates is three or more, it is believed that missed detection happens to the to-be-judged ultrasonic radar.

Through the above steps, false detection or missed detection of the to-be-judged ultrasonic radar is adjusted according to the mutual overlap of coverage ranges of the to-be-judged ultrasonic radar and its adjacent ultrasonic radars, and the obstacle coordinates returned by the ultrasonic radars in the ultrasonic radar array.

A processing module 33 configured to process the obstacle information collected by the ultrasonic radars in the ultrasonic radar array according to the judgment result.

Preferably, if the detection result shows false detection, the obstacle information collected by the ultrasonic radar that falsely detects is deleted.

Preferably, if the detection result shows missed detection, the obstacle information collected by the ultrasonic radar that misses detection may be obtained according to the obstacle information returned by its adjacent ultrasonic radars. In the case that one adjacent ultrasonic radar of the to-be-judged ultrasonic radar returns the obstacle coordinates, the obstacle coordinates returned by the adjacent ultrasonic radar is taken as the obstacle coordinates collected by the to-be-judged ultrasonic radar. In the case that two or more adjacent ultrasonic radars of the to-be-judged ultrasonic radar return the obstacle coordinates, the distance data returned by the two or more ultrasonic radars are fused by a triangulation-based fusion method.

For example, if ultrasonic radar #1 does not return the obstacle coordinates, and its adjacent ultrasonic radars #3 and #2 both return the obstacle coordinates, the obstacle coordinates corresponding to the ultrasonic radar #1 are determined according to the obstacle coordinates returned by its adjacent ultrasonic radars #3 and #2. If the detection result does not show false detection or missed detection, the obstacle information collected by the ultrasonic radars in the ultrasonic radar array are not processed.

A determining module 34 configured to determine a position of the obstacle in the vehicle body coordinate system according to the processed obstacle information collected by the ultrasonic radars, and perform unmanned vehicle decision-making according to the position of the obstacle.

Preferably, if a single ultrasonic radar returns the obstacle coordinates, it is determined that the obstacle is located on a portion where a circular arc with the single ultrasonic radar as the origin and with the obstacle distance as a radius is located in the single ultrasonic radar coverage range of the ultrasonic radar.

Preferably, if two or more adjacent ultrasonic radars return the obstacle coordinates, the distance data returned by the two ultrasonic radars are fused by the triangulation-based fusion method to obtain edge fixed point information of the obstacle.

Preferably, if three or more adjacent ultrasonic radars return the obstacle coordinates, since there is a large number of times of fusion by the triangulation-based fusion method, fusion processing may be performed by a circumcircle method. As for the same edge point of the obstacle, theoretically circular arcs of the plurality of ultrasonic radars with the ultrasonic radar as the origin and the obstacle distance as the radius should intersect at one point. However, in fact, the plurality of segments of circular arcs do not intersect at one point due to factors such as measurement errors and noise interference. Hence, three ultrasonic radars are taken as a group, each group have three segments of circular arcs intersecting at three points, a center of a circumcircle of the three points is taken as a final measurement result of the three ultrasonic radars, and finally, an average value of final measurement results of groups of ultrasonic radars is finally solved as a final fusion result.

It is possible to, through the embodiment of the present application, effectively judge false detection and missed detection happening to the ultrasonic radars in the ultrasonic radar array, precisely determine the position of the obstacle and improve the driving safety of the unmanned vehicle.

In the above embodiments, embodiments are respectively described with different emphasis being placed, and reference may be made to related depictions in other embodiments for portions not detailed in a certain embodiment.

In the embodiments provided by the present invention, it should be understood that the revealed method and apparatus may be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be performed via some interfaces, and indirect coupling or communicative connection of means or units may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present invention, functional units can be integrated in one processing unit, or they can be separate physical presences; or two or more units can be integrated in one unit. The integrated unit described above can be realized in the form of hardware, or they can be realized with hardware and software functional units.

Figure 4:
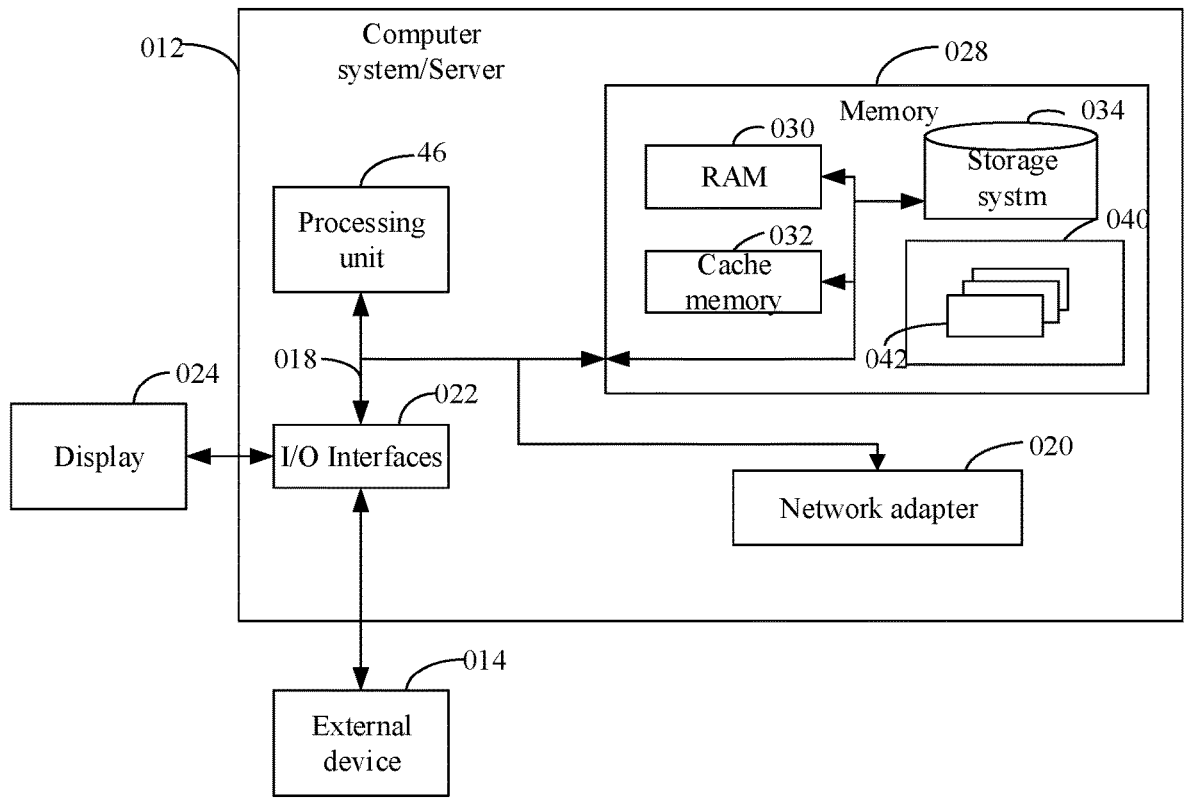
FIG. 4 illustrates a block diagram of an example computer system/server 012 adapted to implement an implementation mode of the present disclosure.

FIG. 4 illustrates a block diagram of an example computer system/server 012 adapted to implement an implementation mode of the present disclosure. The computer system/server 012 shown in FIG. 4 is only an example, and should not bring any limitation to the functions and use scope of the embodiments of the present disclosure.

As shown in FIG. 4, the computer system/server 012 is shown in the form of a general-purpose computing device. The components of the computer system/server 012 may include, but are not limited to, one or more processors or processing units 016, a system memory 028, and a bus 018 that couples various system components including the system memory 028 and the processing unit 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set of (e.g., at least one) program modules that are configured to carry out the functions of embodiments of the present disclosure.

Program/utility 040, having a set of (at least one) program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As shown in the figure, network adapter 020 communicates with the other communication modules of computer system/server 012 via bus 018. It should be understood that although not shown in FIG. 4, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes the functions and/or methods described in the embodiments of the present disclosure by running the programs stored in the system memory 028.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An ultrasonic radar array, wherein the ultrasonic radar array comprises:
   N ultrasonic radars evenly mounted on a bumper of an unmanned vehicle, where N is a positive integer;
   the N ultrasonic radars are distributed from a center to outer sides, with rotation angles gradually increasing towards the outer sides,
   if N is an even number, a first ultrasonic radar is horizontally mounted on a left side of a center of the bumper, and a second ultrasonic radar is horizontally mounted on a right side of the center of the bumper; (N−2)/2 ultrasonic radars are mounted on the left side of the first ultrasonic radar from the center to the outer sides with a previous ultrasonic radar as a reference and is rotated away from the previous ultrasonic radar as reference by an angle of $\alpha$ in turn; (N−2)/2 ultrasonic radars are mounted on the right side of the second ultrasonic radar from the center to the outer sides with a previous ultrasonic radar as a reference and is rotated away from the previous ultrasonic radar as the reference by an angle of $\alpha$ in turn;
   if N is an odd number, a first ultrasonic radar is horizontally mounted at a center of the bumper, (N−1)/2 ultrasonic radars are mounted on the left side of the first ultrasonic radar from the center to the outer sides with a previous ultrasonic radar as a reference and is rotated away from the previous ultrasonic radar as reference by an angle of $\alpha$ in turn; (N−1)/2 ultrasonic radars are mounted on the right side of the first ultrasonic radar from the center to the outer sides with a previous ultrasonic radar as a reference and is rotated away from the previous ultrasonic radar as reference by an angle of $\alpha$ in turn, and
   wherein the number N and the rotation angles gradually increasing towards the outer sides are determined according to a mathematic model of a detection distance and detection shape of each ultrasonic radar, to ensure triple redundancy existing in coverage ranges of the ultrasonic radars, wherein triple redundancy means that a coverage range of three ultrasonic radars are overlapped.

2. A method for detecting an obstacle with an ultrasonic radar array, the ultrasonic radar array comprising: N ultrasonic radars evenly mounted on a bumper of an unmanned vehicle, where N is a positive integer; the N ultrasonic radars are distributed from a center to outer sides, with rotation angles gradually increasing towards the outer sides,
   if N is an even number, a first ultrasonic radar is horizontally mounted on a left side of a center of the bumper, and a second ultrasonic radar is horizontally mounted on a right side of the center of the bumper; (N−2)/2 ultrasonic radars are mounted on the left side of the first ultrasonic radar from the center to the outer sides with a previous ultrasonic radar as a reference and is rotated away from the previous ultrasonic radar as reference by an angle of α in turn; (N−2)/2 ultrasonic radars are mounted on the right side of the second ultrasonic radar from the center to the outer sides with a previous ultrasonic radar as a reference and is rotated away from the previous ultrasonic radar as the reference by an angle of α in turn;

if N is an odd number, a first ultrasonic radar is horizontally mounted at a center of the bumper, (N−1)/2 ultrasonic radars are mounted on the left side of the first ultrasonic radar from the center to the outer sides with a previous ultrasonic radar as a reference and is rotated away from the previous ultrasonic radar as reference by an angle of α in turn; (N−1)/2 ultrasonic radars are mounted on the right side of the first ultrasonic radar from the center to the outer sides with a previous ultrasonic radar as a reference and is rotated away from the previous ultrasonic radar as reference by an angle of α in turn, and wherein the number N and the rotation angles gradually increasing towards the outer sides are determined according to a mathematic model of a detection distance and detection shape of each ultrasonic radar, to ensure triple redundancy existing in coverage ranges of the ultrasonic radars, wherein triple redundancy means that a coverage range of three ultrasonic radars are overlapped, wherein the method comprises:

obtaining obstacle information collected by the ultrasonic radars in the ultrasonic radar array in an obstacle scenario;

judging false detection and missed detection for the obstacle information collected by ultrasonic radars according a preset rule;

processing the obstacle information collected by the ultrasonic radars according to a judgment result;

determining a position of the obstacle according to the processed obstacle information collected by the ultrasonic radars.

3. The method according to claim 2, wherein the preset rule is judging whether there is false detection or missed detection in a to-be-judged ultrasonic radar according to whether adjacent ultrasonic radars of the to-be-judged ultrasonic radar return obstacle coordinates.

4. The method according to claim 3, wherein an adjacent ultrasonic radar of the to-be-judged ultrasonic radar is an ultrasonic radar which is immediately close to the to-be-judged ultrasonic radar on either side of the to-be-judged ultrasonic radar or an ultrasonic radar which is separated from the to-be-judged ultrasonic radar by one ultrasonic radar.

5. The method according to claim 4, wherein the preset rule for judging false detection comprises:

in a case that no adjacent ultrasonic radars of the to-be-judged ultrasonic radar returns obstacle coordinates, if the coverage range of the to-be-judged ultrasonic radar has a coverage range of single ultrasonic radar or an overlapped coverage range of two ultrasonic radars, it is judged there is no false detection; if the coverage range of the to-be-judged ultrasonic radar only has an overlapped coverage range of three ultrasonic radars, it is judged there is false detection;

in a case that one adjacent ultrasonic radar of the to-be-judged ultrasonic radar returns the obstacle coordinates, it is judged there is no false detection;

in a case that two adjacent ultrasonic radars of the to-be-judged ultrasonic radar return the obstacle coordinates, it is judged there is false detection.

6. The method according to claim 4, wherein the preset rule for judging missed detection comprises:

in a case that no adjacent ultrasonic radars of the to-be-judged ultrasonic radar returns obstacle coordinates, it is judged there is no missed detection in the to-be-judged ultrasonic radar;

in a case that one adjacent ultrasonic radar of the to-be-judged ultrasonic radar returns obstacle coordinates, if the coverage ranges of the to-be-judged ultrasonic radar and the adjacent ultrasonic radar returning obstacle coordinates have an overlapped coverage range of two ultrasonic radars, it is judged there is missed detection; if the coverage ranges of the to-be-judged ultrasonic radar and the adjacent ultrasonic radar returning the obstacle coordinates only have an overlapped coverage range of three ultrasonic radars, it is judged there is no missed detection;

in a case that two adjacent ultrasonic radars of the to-be-judged ultrasonic radar return obstacle coordinates, if the coverage ranges of the to-be-judged ultrasonic radar and the adjacent ultrasonic radars returning the obstacle coordinates have an overlapped coverage range of three ultrasonic radars, it is judged there is missed detection; if the coverage ranges of the to-be-judged ultrasonic radar and the adjacent ultrasonic radars returning obstacle coordinates do not have an overlapped coverage range of three ultrasonic radars, it is judged there is no missed detection;

in a case that three or more adjacent ultrasonic radars of the to-be-judged ultrasonic radar return obstacle coordinates, it is judged there is missed detection.

7. The method according to claim 2, wherein the processing the obstacle information collected by the ultrasonic radars according to a judgment result comprises:

if false detection exists in the obstacle information collected by the ultrasonic radar, deleting the obstacle information collected by the ultrasonic radar that falsely detects;

if missed detection exists in the ultrasonic radar, obtaining the obstacle information collected by the ultrasonic radar that misses detection according to the obstacle information returned by its adjacent ultrasonic radars.

8. The method according to claim 7, wherein the determining a position of the obstacle according to the processed obstacle information collected by the ultrasonic radars comprises:

fusing distance data returned by a plurality ultrasonic radars to obtain final obstacle coordinates.

9. An electronic device, comprising:

at least one processor; and a memory communicatively connected with the at least one processor;

wherein the memory stores instructions executable by the at least one processor, and the instructions are executed by the at least one processor to enable the at least one processor to perform a method for detecting an obstacle with an ultrasonic radar array, the ultrasonic radar array comprising: N ultrasonic radars evenly mounted on a bumper of an unmanned vehicle, where N is a positive integer; the N ultrasonic radars are distributed from a center to outer sides, with rotation angles gradually increasing towards the outer sides, if N is an even number, a first ultrasonic radar is horizontally mounted on a left side of a center of the bumper, and a second ultrasonic radar is horizontally mounted on a right side of the center of the bumper; (N−2)/2 ultrasonic radars are mounted on the left side of the first ultrasonic radar from the center to the outer sides with a previous ultrasonic radar as a reference and is rotated away from the previous ultrasonic radar as reference by an angle of α in turn; (N−2)/2 ultrasonic radars are mounted on the right side of the second ultrasonic radar from the center to the outer sides with a previous ultrasonic radar as a reference and is rotated away from the previous ultrasonic radar as the reference by an angle of α in turn;

if N is an odd number, a first ultrasonic radar is horizontally mounted at a center of the bumper, (N−1)/2 ultrasonic radars are mounted on the left side of the first ultrasonic radar from the center to the outer sides with a previous ultrasonic radar as a reference and is rotated away from the previous ultrasonic radar as reference by an angle of α in turn; (N−1)/2 ultrasonic radars are mounted on the right side of the first ultrasonic radar from the center to the outer sides with a previous ultrasonic radar as a reference and is rotated away from the previous ultrasonic radar as reference by an angle of α in turn, and wherein the number N and the rotation angles gradually increasing towards the outer sides are determined according to a mathematic model of a detection distance and detection shape of each ultrasonic radar, to ensure triple redundancy existing in coverage ranges of the ultrasonic radars, wherein triple redundancy means that a coverage range of three ultrasonic radars are overlapped, wherein the method comprises:

obtaining obstacle information collected by the ultrasonic radars in the ultrasonic radar array in an obstacle scenario;

judging false detection and missed detection for the obstacle information collected by ultrasonic radars according a preset rule;

processing the obstacle information collected by the ultrasonic radars according to a judgment result;

determining a position of the obstacle according to the processed obstacle information collected by the ultrasonic radars.

10. The electronic device according to claim 9, wherein the preset rule is judging whether there is false detection or missed detection in a to-be-judged ultrasonic radar according to whether adjacent ultrasonic radars of the to-be-judged ultrasonic radar return obstacle coordinates.

11. The electronic device according to claim 10, wherein an adjacent ultrasonic radar of the to-be-judged ultrasonic radar is an ultrasonic radar which is immediately close to the to-be-judged ultrasonic radar on either side of the to-be-judged ultrasonic radar or an ultrasonic radar which is separated from the to-be-judged ultrasonic radar by one ultrasonic radar.

12. The electronic device according to claim 11, wherein the preset rule for judging false detection comprises:

in a case that no adjacent ultrasonic radars of the to-be-judged ultrasonic radar returns obstacle coordinates, if the coverage range of the to-be-judged ultrasonic radar has a coverage range of single ultrasonic radar or an overlapped coverage range of two ultrasonic radars, it is judged there is no false detection; if the coverage range of the to-be-judged ultrasonic radar only has an overlapped coverage range of three ultrasonic radars, it is judged there is false detection;

in a case that one adjacent ultrasonic radar of the to-be-judged ultrasonic radar returns obstacle coordinates, it is judged there is no false detection;

in a case that two adjacent ultrasonic radars of the to-be-judged ultrasonic radar return obstacle coordinates, it is judged there is false detection.

13. The electronic device according to claim 11, wherein the preset rule for judging missed detection comprises:

in a case that no adjacent ultrasonic radars of the to-be-judged ultrasonic radar return obstacle coordinates, it is judged there is no missed detection in the to-be-judged ultrasonic radar;

in a case that one adjacent ultrasonic radar of the to-be-judged ultrasonic radar returns obstacle coordinates, if the coverage ranges of the to-be-judged ultrasonic radar and the adjacent ultrasonic radar returning obstacle coordinates have an overlapped coverage range of two ultrasonic radars, it is judged there is missed detection; if the coverage ranges of the to-be-judged ultrasonic radar and the adjacent ultrasonic radar returning the obstacle coordinates only have an overlapped coverage range of three ultrasonic radar coverage ranges overlapping, it is judged there is no missed detection;

in a case that two adjacent ultrasonic radars of the to-be-judged ultrasonic radar return obstacle coordinates, if the coverage ranges of the to-be-judged ultrasonic radar and the adjacent ultrasonic radars returning obstacle coordinates have an overlapped coverage range of three ultrasonic radars, it is judged there is missed detection; if the coverage ranges of the to-be-judged ultrasonic radar and the adjacent ultrasonic radars returning obstacle coordinates do not have an overlapped coverage range of three ultrasonic radars, it is judged there is no missed detection;

in a case that three or more adjacent ultrasonic radars of the to-be-judged ultrasonic radar return obstacle coordinates, it is judged there is missed detection.

14. The electronic device according to claim 9, wherein the processing the obstacle information collected by the ultrasonic radars according to the judgment result comprises:

if false detection exists in the obstacle information collected by the ultrasonic radar, deleting the obstacle information collected by the ultrasonic radar that falsely detects;

if missed detection exists in the ultrasonic radar, obtaining the obstacle information collected by the ultrasonic radar that misses detection according to the obstacle information returned by its adjacent ultrasonic radars.

15. The electronic device according to claim 14, wherein the determining a position of the obstacle according to the processed obstacle information collected by the ultrasonic radars comprises:

fusing distance data returned by a plurality ultrasonic radars to obtain the final obstacle coordinates.

16. A non-transitory computer-readable storage medium storing computer instructions therein, wherein the computer instructions are used to cause the computer to perform a method for detecting an obstacle with an ultrasonic radar array according to claim 2.

17. The non-transitory computer-readable storage medium according to claim 16, wherein the preset rule is judging whether there is false detection or missed detection in a to-be-judged ultrasonic radar according to whether adjacent ultrasonic radars of the to-be-judged ultrasonic radar return obstacle coordinates.

18. The non-transitory computer-readable storage medium according to claim 17, wherein an adjacent ultrasonic radar of the to-be-judged ultrasonic radar is an ultrasonic radar which is immediately close to the to-be-judged ultrasonic radar on either side of the to-be-judged ultrasonic radar or an ultrasonic radar which is separated from the to-be-judged ultrasonic radar by one ultrasonic radar.

\* \* \* \* \*